United States Patent Office 3,335,759
Patented Aug. 15, 1967

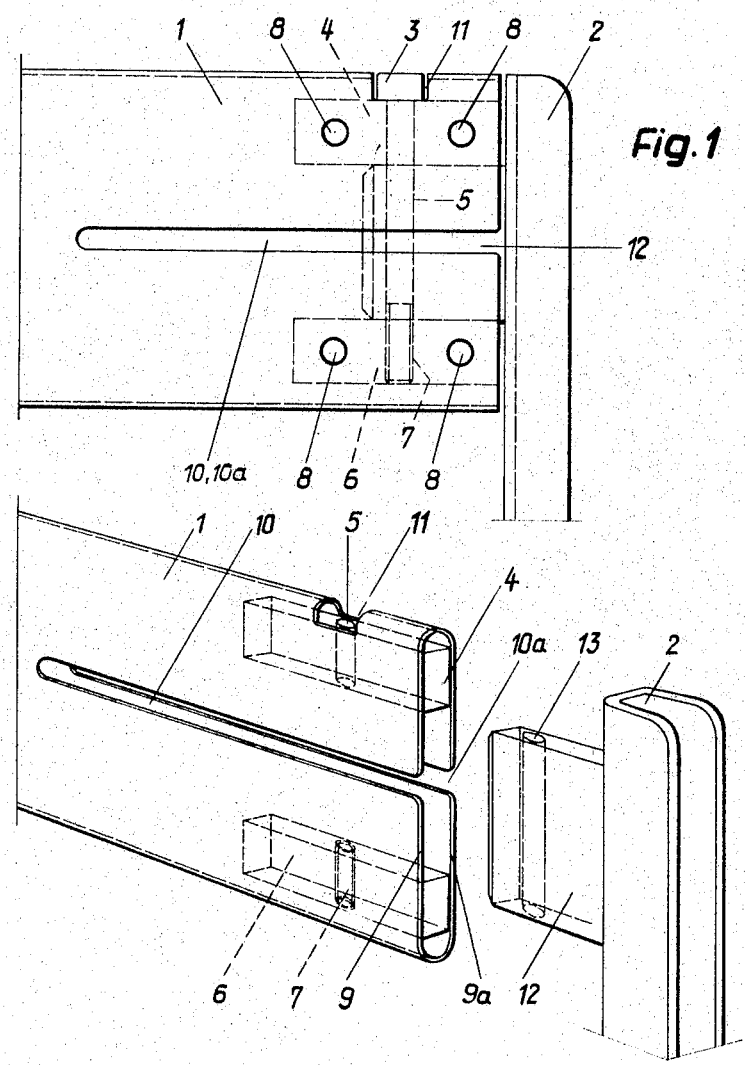

3,335,759
CORNER CONNECTION ON A HEDDLE FRAME
Bernhard R. Koch, Horgenberg, Switzerland, assignor to Grob & Co. AG, Horgen, Switzerland
Filed Oct. 14, 1965, Ser. No. 495,997
Claims priority, application Switzerland, Apr. 30, 1965, 6,025/65
7 Claims. (Cl. 139—91)

ABSTRACT OF THE DISCLOSURE

In abstract form, the invention comprises a separable connection for heddle frames to unite the corner joints thereof and to form a quick detachable joint between the vertical and horizontal members of said frame in which clamping members thereon are actuated and are connected by the threaded fastener means.

---

The subject matter of the present invention is a corner connection on a heddle frame for the releaseable connection of the lateral supports to the hollow frame staves by mortising and clamping.

Such corner connections must effect a solid but releaseable connection of the lateral supports to the frame staves in a simple but yet safe manner and with a minimum of parts which have to be loosened or secured such as for example screws.

It has already been suggested to produce the corner connections on a heddle frame having frame staves of hollow profile by arranging that the ends of the frame staves are embraced above and below by two bands secured to the lateral supports. A wooden peg, punched into the hollow profile and completely filling the same projects into a corresponding slot of the lateral support and fastening is effected by two screws passing through the frame stave parallel to the lateral support. By tightening up the nuts on these screws the said bands are pressed against the frame stave. Such an arrangement has the disadvantage that the inner edge of the frame stave is not left free for the elements securing the heddle carrying rods adjacent to the lateral supports because, as explained above the squared off ends of the bands secured to the lateral supports are located at this inner edge. On tightening the screws the side walls of the hollow frame stave can easily become deformed, or if the danger of deformation is to be avoided the screws cannot be tightened very much with the results that the security of the connection is not guaranteed. Furthermore this arrangement has the disadvantage that each lateral support requires four screws or nuts to be tightened and besides this the screws and nuts project beyond the profile of the frame staves.

It is an object of the present invention to obviate the said disadvantages and this is achieved by arranging that on one of the parts connected together (frame stave or lateral support) two parts resilient in relation to each other are provided and on the other part at least one rigidly secured part is provided whereby the resilient parts may be immovably clamped against the rigid part by means of at least one screw means exerting an effect on all the said parts and located within the hollow profile frame stave.

With the corner connection of the invention it is possible to manage with a single fastening screw which runs parallel to the lateral support and can be disposed completely within the frame stave. The connecting members and the clamping members of the connection, the latter being drawn closer together or formed apart by the screw means to make the connection firm, are all located within the hollow frame stave so that no projecting parts are present.

Further objects and advantages of the present invention will become apparent from the following description of some embodiments thereof given by way of example only, and with reference to the accompanying drawings in which:

FIG. 1 shows the right hand top corner connection of a heddle frame according to a first embodiment of the invention in elevation.

FIG. 2 shows an exploded perspective view of the corner connection according to FIG. 1, and FIGS. 3 to 5 show elevations of three further embodiments of the invention.

Figure 3:
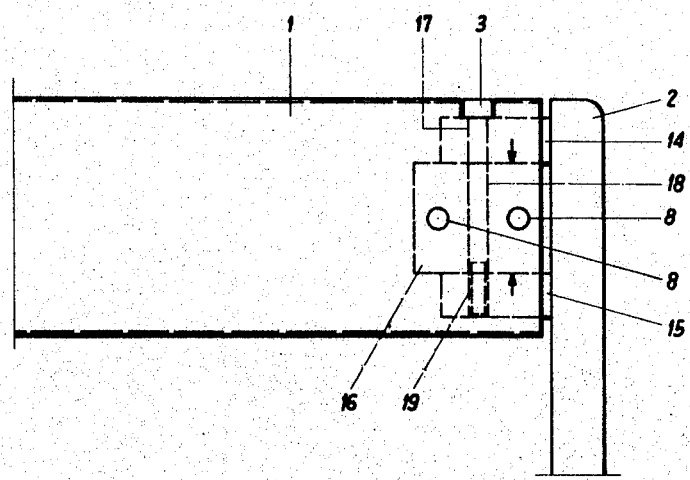

In FIGS. 1 and 2, 1 identifies the upper frame stave of the heddle frame stave constructed of a metal hollow profile and 2, the removable lateral support. Two jaw members 4, 6 are located in the hollow profile of the frame stave and are connected firmly thereto as by welding at places 8 (see FIG. 1). The jaw members 4, 6 could also be secured to the frame stave by rivetting, soldering etc., or they could be built up from the material of the frame stave itself.

A hole 5 is provided in the jaw member 4 for a screw 3. At the same time a screw threaded bore 7 is arranged, below the hole 5, in the jaw member 6 to receive the threaded end of the screw 3. The head of the screw 3 is located in a recess 11 of the frame stave 1, the said recess being obtained by a removal of the material of the frame stave above the jaw member 4.

The side walls 9 and 9a of the frame stave 1 are made resilient by means of slots 10, 10a running parallel to the longitudinal direction of the frame stave between the clamping jaw members 4, 6.

A peg 12 is secured to the lateral support 2 by welding or in some other suitable manner. It is provided with a through hole 13 parallel to the longitudinal direction of the lateral support 2, the axis of the hole being in alignment with those of the holes 5 and 7, when the parts are placed together as in FIG. 1, so that the screw 3 passes through the holes 5 and 13 with its unthreaded portion and its threaded portion can be screwed into the threaded bore 7.

On assembling the connection, the peg 12 of the lateral support 2 is led into the hollow space in the frame 1 formed by the side walls 9 and 9a and the jaw members 4 and 6 until the longitudinal axis of the through hole 13 is in alignment with the longitudinal axes of the hole 5 and of the threaded bore 7. The screw 3 is then pushed through the cut-away portion of the frame stave at the recess 11 through the hole 5, then through the hole 13 into the threaded hole 7 and is screwed therein, by tightening the screw 3 the peg 12 is clamped between the jaw members 4 and 6.

In this way a connection, rigid in all directions is established between the frame stave 1 and the lateral support 2 in the desired position. If necessary the embodiment shown in FIGS. 1 and 2 may be so varied that more than one screw 3 is provided.

Figure 4:
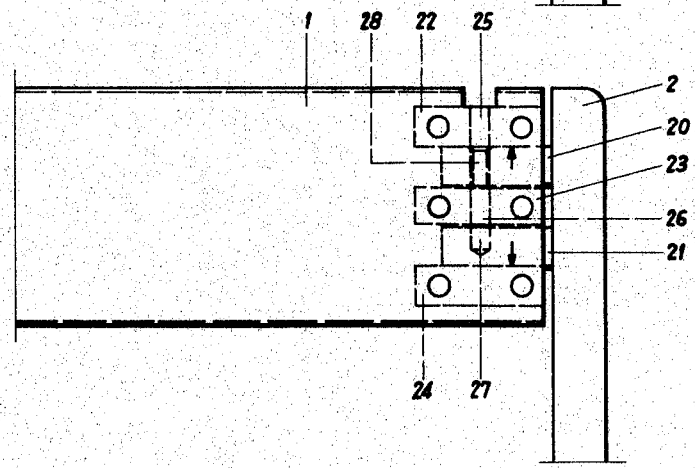
Figure 5:
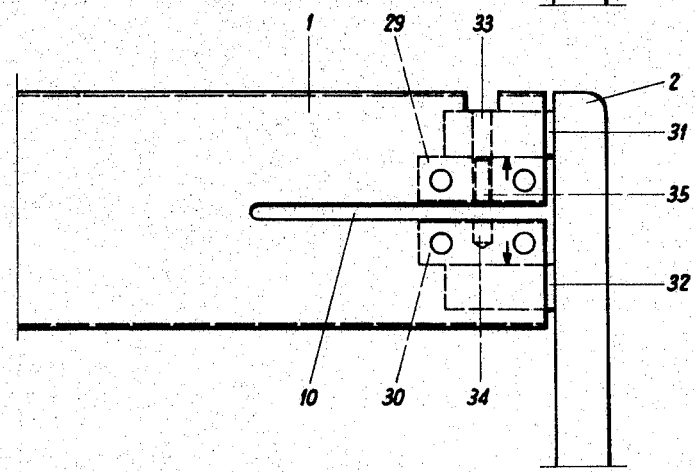

FIGS. 3, 4 and 5 show different arrangements of the clamping jaws and the peg lying therebetween.

In FIG. 3 two clamping jaws 14 and 15 are secured on the lateral support 2. A peg 16 is placed in the hollow space of the frame stave 1 and secured by welded points 8. The upper clamp jaw 14 and the peg 16 each have a bore 17, 18 in alignment with each other through which the clamping screw 3 can be screwed into the thread 19 in the lower cheek 15. In this way the two clamping cheeks 14 and 15 are pressed in the direction of the arrows against the peg 16 arranged in the frame stave, utilising their inherent resiliency.

In the embodiment shown in FIG. 4 two pegs 20 and 21 are secured to the lateral support 2. Three clamping jaws 22, 23, 24 are secured in the hollow space of the frame stave 1, for example by welding. The cheeks 22 and 23 have through holes 25 and 26 and the peg 21 a blind hole 27 in alignment therewith. A screw-threaded hole 28 also in alignment is provided in the upper peg 20. By screwing in a clamping screw the two pegs 20 and 21 are pressed in the direction of the arrows against the outer jaws 22 and 24. Due to the inherent resiliency in the pegs 20, 21 a connection free of play is likewise produced.

In FIG. 5 two clamping members 29 and 30 are secured within the hollow space of the frame stave 1. The pegs or connecting members 31 and 32 are secured to the lateral support 2 and embrace the clamping members 29, 30. The peg 31 has a through hole 33 and the clamping member 30 a blind hole 34. The clamping member 29 has a screw threaded hole 35 in alignment with the bores. The end of the frame stave 1 is slit at 10 to increase the resilience between the members 29 and 30 by tightening a clamping screw the members 29 and 30 are pressed against the outer pegs 31 and 32 whereby in this embodiment also the frame stave 2 is mounted free from play.

It is also within the scope of the invention that the clamping members 4 and 6 shown in FIG. 1 may be constituted by the narrow edges forming the hollow profile of the frame stave 1. Likewise projecting longitudinal ribs or cross webs in the hollow space of the frame stave 1 could serve as the clamping members or pegs (FIG. 3 peg 16).

All the described embodiments have the advantage of providing a secure connection of the lateral supports to the frame staves by a single sunk screw. Of course all four corners of a heddle frame are conveniently built up in the same way. As can be seen no outwardly projecting parts are present.

What I claim is:

1. A heddle frame, said frame including a hollow frame stave member, a support member connected thereto, two clamping parts resiliently displaceable with respect to one another and fixed to one of said members, at least one connecting part fixed to the other of said members, and a single screw means extending through at least some of said parts and urging said clamping parts into tight engagement with said connecting part, said clamping parts and said connecting part being provided with vertical aligned holes for the screw means.

2. A corner connection in a heddle frame, said connection releasably joining a lateral support member with a hollow frame stave member and comprising two clamping parts resiliently displaceable with respect to one another and fixed to one of said members and a third connecting part fixed to the other of said members, said connection also comprising at least one screw means clamping the said three members together to secure said connection, said clamping parts and said connecting part being provided with vertical aligned holes for the screw means.

3. A heddle frame, said frame including a hollow frame stave member extending horizontally, a vertical lateral support member connected thereto, two spaced jaw members secured to one of said members and a connecting member secured to the other of said members, said connecting member being located between said jaw members and the two jaw members and connecting member being located within said hollow frame stave member, said three members being formed with aligned holes, screw means, located entirely within the frame stave member received in said holes, said screw means serving to clamp said jaw members to said connecting member, said frame stave member being formed with an aperture through which said screw means is accessible.

4. A heddle frame, said frame comprising at least one hollow frame stave member extending horizontally and a vertical lateral support member connected thereto, said connection comprising,
(I) two clamping members rigidly secured within one end of said frame stave member, one on the upper half and one on the lower half thereof, said upper and lower halves being separated for relative resilient movement by longitudinal end slits in the sides of said frame stave member,
(II) two connecting members rigid with said lateral support end extending into said frame stave member, one above the upper clamping member and one below the lower clamping member, one of said connecting members and the adjacent clamping member having aligned holes therethrough, the hole in the clamping member being screw threaded, the other clamping member having a blind hole therein aligned with the aforementioned holes, said connection also comprising
(III) a screw extending through said aforementioned holes into said blind hole and tightened in said screw thread to urge said clamping members apart and in tight engagement with said connecting members, the head of said screw being wholly within the frame stave member and accessible through an aperture therein.

5. A corner connection in a heddle frame, said connection securing a hollow frame stave member to a lateral support member, and comprising
(I) two clamping members rigidly secured to the frame stave member within one end thereof, one on the upper half and one on the lower half thereof, said upper and lower halves being separated for relative resilient movement by longitudinal end slits in the sides of the frame stave member,
(II) a connecting member rigidly secured to the lateral support member and extending into the hollow frame stave member between said clamping members, said clamping members and said connecting member being pierced by aligned holes
(III) screw means extending through said aligned holes and clamping said clamping members tightly against said connecting member, said screw means being located entirely within said frame stave member and the head thereof being accessible through an aperture in said frame stave member.

6. A corner connection in a heddle frame, said connection securing a hollow frame stave member to a lateral support member and comprising
(I) two clamping members secured to the lateral support member, said members being resiliently displaceable relative to one another and extending into the hollow space within the hollow frame stave member,
(II) a connecting member secured to the hollow frame stave member and located within the hollow space thereof between said clamping members, said three members having aligned holes therethrough, and
(III) screw means engaged in said holes and firmly clamping said clamping members onto said connecting member therebetween, said screw means being disposed entirely within said hollow frame stave member and being accessible through an aperture in said frame stave member.

7. A corner connection in a heddle frame, said connection securing a hollow frame stave member to a lateral support member and comprising
(I) two spaced connection members secured on the lateral support member and extending into the hollow space within the hollow frame stave member,
(II) three spaced clamping members secured to said hollow frame stave member within said member and receiving between them said connecting members which are separated by one of said clamping members at least some of said clamping and connecting members being pierced by aligned holes, and (III) screw means extending through said aligned holes and serving to clamp said clamping and connecting members together.

References Cited

UNITED STATES PATENTS 2,216,682  10/1940  Zurcher et al. _____ 139—92
2,897,844  8/1959  Graf _____ 139—91
2,981,293  4/1961  Nussbaum _____ 139—91

FOREIGN PATENTS 224,575  11/1962  Austria.
673,282  6/1952  Great Britain.
925,562  5/1963  Great Britain.
365,039  11/1962  Switzerland.

MERVIN STEIN, *Primary Examiner.*

J. KEE CHI, *Assistant Examiner.*